US012232443B2

(12) United States Patent
Johansson et al.

(10) Patent No.: US 12,232,443 B2
(45) Date of Patent: Feb. 25, 2025

(54) HEIGHT ADJUSTMENT DEVICE AND ROBOTIC MOWER COMPRISING A HEIGHT ADJUSTMENT DEVICE

(71) Applicant: HUSQVARNA AB, Huskvarna (SE)

(72) Inventors: Jörgen Johansson, Jönköping (SE); Stefan Stark, Huskvarna (SE); Lars Ederfors, Benkeryd (SE)

(73) Assignee: HUSQVARNA AB, Huskvarna (SE)

( * ) Notice: Subject to any disclaimer, the term of this patent is extended or adjusted under 35 U.S.C. 154(b) by 734 days.

(21) Appl. No.: 17/497,500

(22) Filed: Oct. 8, 2021

(65) Prior Publication Data
US 2022/0110245 A1 Apr. 14, 2022

(30) Foreign Application Priority Data
Oct. 8, 2020 (SE) .................... 2051175-4

(51) Int. Cl.
*A01D 34/74* (2006.01)
*A01D 34/64* (2006.01)
*A01D 34/78* (2006.01)
*A01D 34/81* (2006.01)
*A01D 101/00* (2006.01)

(52) U.S. Cl.
CPC ............. *A01D 34/74* (2013.01); *A01D 34/64* (2013.01); *A01D 34/81* (2013.01); *A01D 34/78* (2013.01); *A01D 2101/00* (2013.01)

(58) Field of Classification Search
CPC ........ A01D 34/64; A01D 34/74; A01D 34/81; A01D 34/008
See application file for complete search history.

(56) References Cited

U.S. PATENT DOCUMENTS

| 9,357,699 | B2* | 6/2016 | Elonsson | ............... F16H 25/24 |
| 2020/0170186 | A1* | 6/2020 | Curtis | ................... F16H 25/20 |

FOREIGN PATENT DOCUMENTS

| CN | 109496531 | * | 3/2019 | |
| CN | 109729814 | A | 5/2019 | |
| CN | 211482000 | U | 9/2020 | |
| DE | 102010005975 | A1 | 8/2011 | |
| DE | 102015207684 | A1 * | 11/2015 | ........... A01D 34/006 |
| EP | 2412220 | A1 | 2/2012 | |
| GB | 992840 | A | 5/1965 | |
| GB | 1010481 | A | 11/1965 | |

(Continued)

OTHER PUBLICATIONS

Swedish Search Report and Office Action for Swedish Application No. 2051175-4 mailed Apr. 15, 2021.

*Primary Examiner* — Adam J Behrens
*Assistant Examiner* — Ashley A Kaercher
(74) *Attorney, Agent, or Firm* — Burr & Forman LLP

(57) ABSTRACT

A height adjustment device may include a height adjustment screw having outer threads and being oriented substantially vertically and arranged rotatably in relation to a chassis, and an adjustment nut connected to a bracket and comprising inner threads for engagement with the threads of the adjustment screw, such that a rotary movement of the height adjustment screw results in a vertical linear movement of the bracket. The adjustment nut may include a first part and a second part which together enclose the adjustment screw, and the first part may be adapted to be attached to the second part. A robotic mower may include the height adjustment device.

12 Claims, 2 Drawing Sheets

(56) References Cited

FOREIGN PATENT DOCUMENTS

| JP | H0579102 U | 10/1993 |
|---|---|---|
| WO | 2014007696 A1 | 1/2014 |
| WO | 2014037624 A1 | 3/2014 |

\* cited by examiner

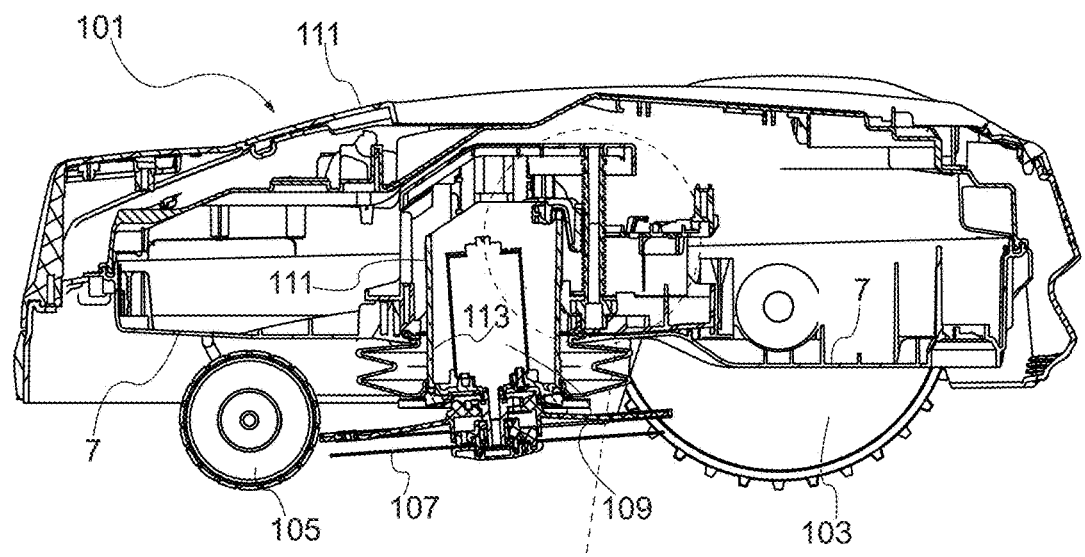
Fig 1
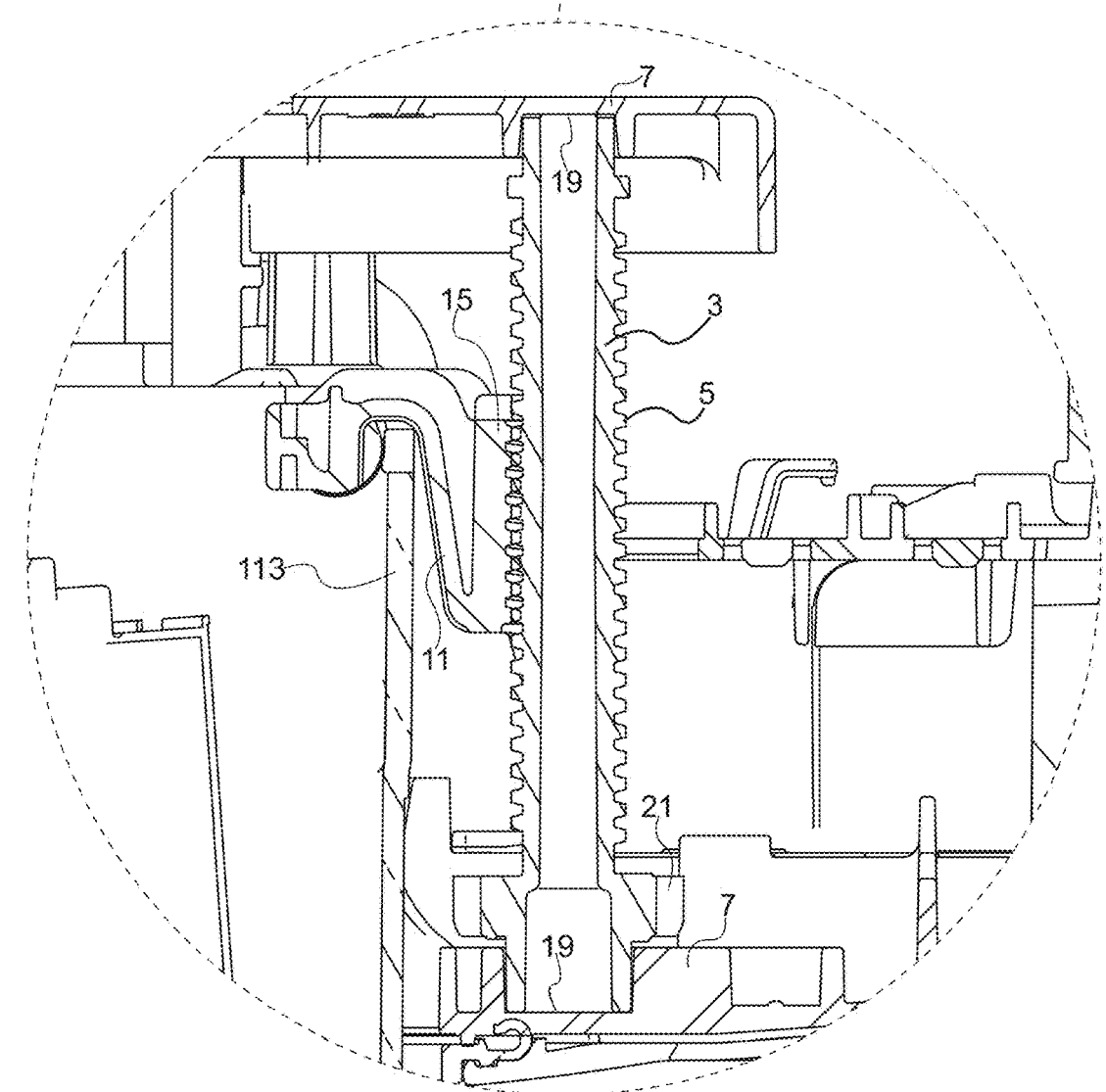

HEIGHT ADJUSTMENT DEVICE AND ROBOTIC MOWER COMPRISING A HEIGHT ADJUSTMENT DEVICE

TECHNICAL FIELD

The present disclosure relates to a height adjustment device, comprising a height adjustment screw having outer threads and being oriented substantially vertically and arranged rotatably in relation to a chassis, and an adjustment nut connected to a bracket and comprising inner threads for engagement with the threads of the adjustment screw, such that a rotary movement of the height adjustment screw results in a vertical linear movement of the bracket. The present disclosure further relates to a robotic mower comprising such a height adjustment device.

BACKGROUND

Such height adjustment devices may be used to adjust the height of an implement in relation to the chasses. An example of the height adjustment device of initially mentioned kind is described in WO-2014/007696-A1, which discloses a height adjustment device where an adjustment screw is kept in engagement with an adjustment nut by means of a biasing element. This means that an open nut can be used, where, during manufacturing, there is no need to initially insert the screw into the nut. Thereby, it is not necessary to provide the screw with a free end that can be inserted into the nut, and assembling of the parts can be a quick and effective process.

One problem associated with height adjustment devices of this kind is how to provide a reliable screw to nut connection.

SUMMARY

One object of the present disclosure is therefore to provide a height adjustment device which is reliable and can be assembled by a quick operation. This object is achieved by means of a height adjustment device as defined in claim 1. More specifically, in a height adjustment device of the initially mentioned kind, the adjustment nut comprises a first part and a second part which together enclose the adjustment screw. The first part is adapted to be attached to the second part. This means that the nut can be made to clasp the adjustment screw at the mid portion thereof, for instance, thereby not requiring the adjustment screw to be inserted therein from one end when the height adjustment device is assembled. This makes assembling quicker and more efficient. At the same time, no resilient member or the like is needed to keep threads of the nut and screw in engagement, and the connection therebetween becomes very reliable.

The inner threads of the adjustment nut may be located on one of the first and second parts while the other is free from inner threads engaging with the adjustment screw. The first part may then be adapted to be attached to the second part by a mutual linear movement, parallel with the center axis of the adjustment screw. The part without threads can then slide on top of the screw's threads while the nut part with threads engages with the threads of the screw. The part without threads may slide in this way until it engages with the other part in a direction perpendicular to the direction in which the first and second members are to be kept together to firmly clasp the screw, which provides for a firm connection.

The inner threads may be located at the first part which is connected to the bracket and the second part may comprise a corresponding, partly cylindrical surface without threads. This means that the thread-to thread connection is in direct connection with the bracket carrying the device to be adjusted.

The first nut part may comprise grooves, and the second part tongues, which are insertable in the grooves in a direction parallel adjustment screw center axis, and a snap function may provided to keep the first and second parts in engagement at the end of the aforementioned linear movement. This provides a very reliable connection.

The adjustment screw may be fitted between first and second recesses in the chassis.

The adjustment screw may comprise at least one thread stop that prevent further movement beyond a defined end position. This provides a well-defined end position in the screw's movement that can be used for calibration purposes.

The adjustment screw may be made up from two halves, joined along the screw axis.

The bracket may be made in one piece with either of the first and second nut parts. This allows the screw to be manufactured in an efficient injection moulding process if made of plastic. Also, no particular nut to bracket connector need be provided.

The nut and screw may typically be made in a plastic material such as Polyoxymethylene, POM.

The present disclosure further considers a robotic mower comprising a chassis, wheels carrying the chassis, and a cutting arrangement suspended by the chassis, wherein the cutting arrangement is arranged in the chasses with a height adjustment device as outlined above.

The adjustment screw is arranged in the chassis, being fitted in between first and second recesses therein.

The electric motor driving the cutting arrangement may be attached to and enclosed by to a cutting arrangement casing, which is slideable with regard to the chassis.

BRIEF DESCRIPTION OF THE DRAWINGS

FIG. 1 shows a cross section through a robotic lawn mower and an enlarged portion thereof comprising a height adjustment device.

DETAILED DESCRIPTION

Figure 2:
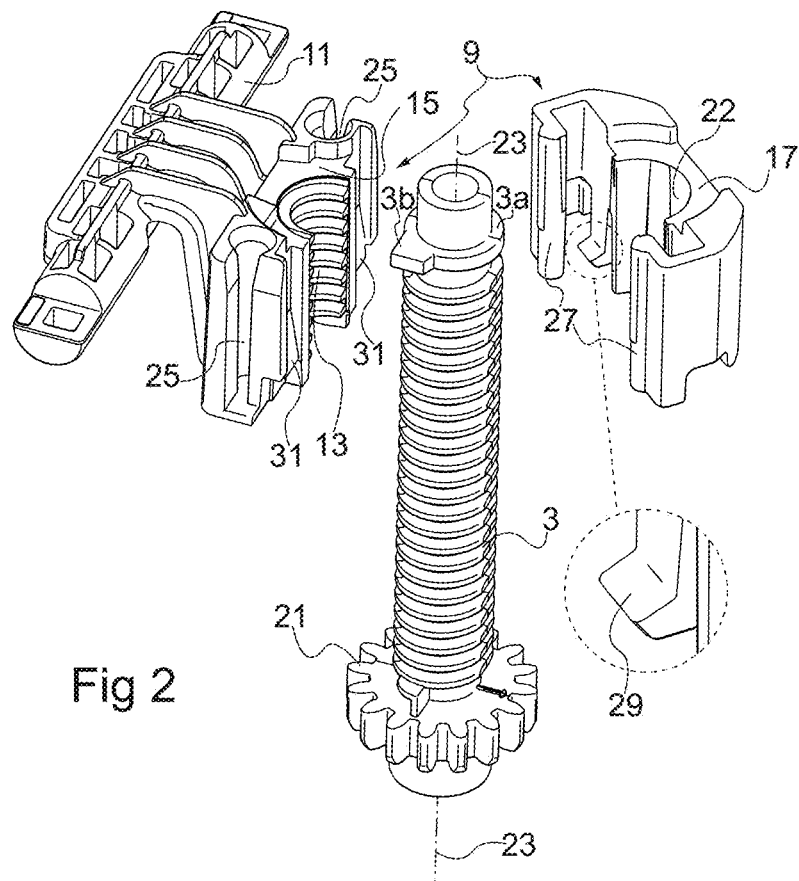
FIG. 2 illustrates in a perspective view disassembled parts of a height adjustment device.

The present disclosure relates to a height adjustment device that, for instance, can be used in a robotic lawn mower 101 as illustrated in FIG. 1. Typically, such a lawn mower comprises a chassis 7 which is carried by wheels, in the illustrated case driven rear wheels 103 and swiveling front wheels 105. The chassis 7 suspends a cutting arrangement comprising the height adjusting arrangement according to the present disclosure. The cutting arrangement has a cutting disc 107 carrying a number of blades and being driven by an electric motor 109. As illustrated, the cutting arrangement may be slightly inclined with regard to the ground to achieve that cutting mostly takes place at a portion of the cutting disc periphery to somewhat relieve the requirements on the motor 109. The robotic lawn mower 101 further comprises an outer cover 111 that encloses the chassis 7.

The cutting arrangement 107, 113 is adjustable upwards and downwards with regard to the lawn surface, as defined by the lawn mower wheels 103, 105 when resting on the lawn surface. To this end, the cutting disc 107 and the driving electric motor 109 driving the cutting disc are attached to and, in the motor's 109 case, enclosed by to a cutting arrangement casing 113. The casing 113 in turn is arranged slideably with regard to the chassis, e.g. suspended by guides therein, or by being arranged in an opening in the casing 113 having a complementing inner shape. For instance, the casing 113 may be cylindrical and run in a cylindrical recess having an inner diameter roughly corresponding to the outer diameter of the casing 113.

The height adjusting device which is used for making the cutting arrangement 107, 113 move upwards and downwards is illustrated in greater detail in the enlarged portion of FIG. 1.

The height adjustment device comprises a screw 3 which is oriented substantially vertically as defined by the usual orientation of the mower standing on a flat horizontal lawn surface. The screw 3 is arranged rotatably in relation to the chassis 7, in the illustrated case it is fitted inside the chassis 7, its both ends being supported and affixed in a rotatable manner by parts of the chassis, e.g. being inserted in cylindrical recesses 19 therein, as illustrated. The screw comprises an outer thread 5 over most of its outer surface and, in the illustrated case, comprises a cog 21 that can be run by a servo, a stepping motor, or the like (not shown). Optionally the cog 21 may be integrated with the screw 3, i.e. made in one piece therewith. The screw 3 may be hollow and may be made up by two halves 3a, 3b, each having a cog 21 half and being joined along the length of the screw 3vv as best seen in FIG. 2. This allows the screw 3 to be efficiently produced through injection moulding, as the goods thickness can be kept small.

The height adjustment device further comprises an adjustment nut, a part of which 15 is shown in FIG. 1. The adjustment nut 9 (cf. FIG. 3b, for instance) is connected to a bracket 11, which as shown in FIG. 1 may be connected to the cutting arrangement casing 113.

The nut comprises inner threads 13 which is in engagement with the outer threads 5 of the adjustment screw 3. Thereby, a rotary movement of the height adjustment screw 3 results in a vertical linear movement of the bracket 11. By driving the cog 21 with a stepping motor, for instance, to rotate the screw 3, it is therefore possible to make the bracket 11 and thereby the cutting arrangement to move upwards and downwards with regard to the lawn surface.

FIG. 2 illustrates in a perspective view disassembled parts of a height adjustment device. As illustrated, the adjustment nut 9 may generally comprise a first part 15 and a second part 17 which together are adapted to enclose the adjustment screw 3. More specifically, the first part 15 is adapted to be attached to the second part 17.

This could be accomplished in various ways such as gluing the first part 15 to the second part 17, attaching the first part 15 to the second part 17 by means of screws, or having one part of the nut connected to the other by means of a hinge with a snap lock at the opposing side. However, it may preferably be achieved by means of a sliding snap function as will be shown, as this provides an efficient assembling of the parts 15, 17.

In the example illustrated in FIG. 2, this is arranged by providing the inner threads 13 only on one of the parts 15, 17 making up the adjustment nut 9, in the illustrated case on the first part 15, which is made in one part with the bracket 11, and in an inner partly cylindrical portion thereof. The other part, the second 17, is free from inner threads engaging with the adjustment screw 3 and may instead have an inner partly cylindrical surface 22 that has a diameter corresponding to the maximum diameter of the screw threads 5. This means that the first part 15 can engage with the threads 5 of the screw 3 while the second part 17 can slide along the screw 3 to be connected with the first part 15 and be secured thereto, thereby tightly connecting the screw 3 to the assembled nut 9. There are enough inner threads 13 available on the first nut part 15 to provide a reliable conversion of screw 3 rotation to vertical displacement of the nut 9 and the bracket 11. It would be possible to instead provide the inner threads on the second part 17 and keep the first part smooth, but this requires the force displacing the bracket to be transmitted via the interface between the first 15 and second 17 nut parts and therefore the illustrated example is preferred.

In the illustrated case, the screw 3, nut 9 and bracket 11 are made in Polyoxymethylene (POM), which is considered a suitable material thanks to its high stiffness, dimensional stability, and low friction. However, other plastic materials or metals such as steel aluminum, magnesium, or zinc, for instance, may be considered.

The first and second parts are adapted to be attached to each other by a mutual linear movement, parallel with the center axis 23 of the adjustment screw. As illustrated, the first nut part 15 may then comprise grooves 25 at each side of the threaded part 13. The second part 17 may comprise corresponding tongues 27 that fit in those grooves 25 when inserted in a direction parallel with the screw axis 23, optionally in a form locking manner.

Figures 3A, 3B:
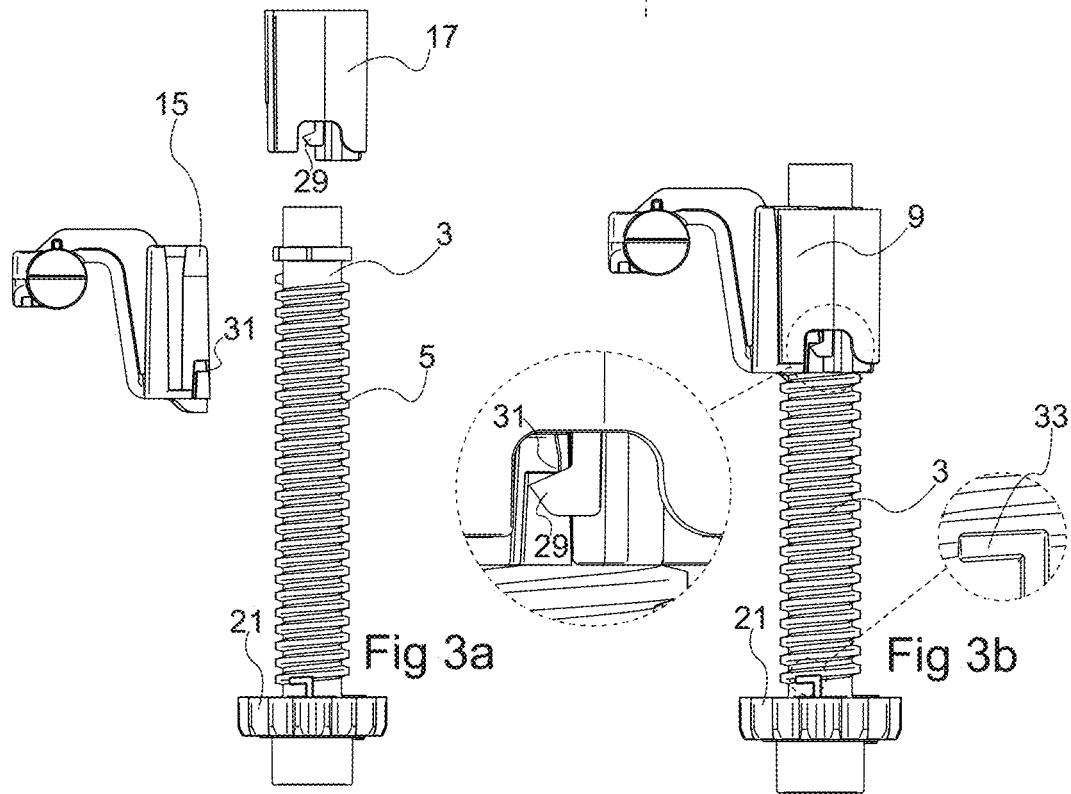
FIGS. 3a and 3b illustrate side views of the parts included in the height adjustment device before and after assembling.

There may be provided locking features, such as illustrated in the enlarged portion of FIG. 2 where flexible hooks 29 of the second part 17 snap in place behind corresponding shoulder portions 31 of the first part 15 when the tongues 27 are fully inserted in the grooves 25, thereby locking the first part 15 to the second part 17 also in the sliding direction as shown in FIGS. 3a and 3b, showing side views of the parts included in the height adjustment device before and after assembling.

There may be provided thread stops 33 at one or both thread 5 ends that prevent further rotation of the screw 3 and correspondingly any further linear movement of the screw 3 beyond a defined end position. The thread stops 33 may be a diversion of the thread from the helix-shape of the remainder of the thread 5 or simply an obstacle in the thread 5 that will become stuck against the corresponding inner thread of the nut 9. In FIG. 3b, a stop 33 is visible at one end of the thread 5, but may preferably be provided at both ends of the thread 5 as the nut 9 is fitted around the screw 3, which thus need not be initially screwed into the nut 9. The stops 33 can be used to calibrate the height adjustment device, e.g. by driving the screw 3 to a stop by means of a stepping motor and registering in the robotic mower's control system the corresponding position as an end position.

The present disclosure is not limited to the above-described examples and may be varied and altered in different ways within the scope of the appended claims. For instance, it would be possible to change the location of the adjustment screw such that it is instead located in the cutting device. Further the tongues and grooves of the nut parts could change places or be replaced with other corresponding means such as pins fitting into openings, for instance.

The invention claimed is:

1. A height adjustment device comprising a height adjustment screw having outer threads and being oriented substantially vertically and arranged rotatably in relation to a chassis, and an adjustment nut connected to a bracket and comprising inner threads for engagement with the outer threads of the height adjustment screw, such that a rotary movement of the height adjustment screw results in a vertical linear movement of the bracket, wherein the adjustment nut comprises a first part and a second part which together enclose the height adjustment screw, the first part being adapted to be attached to the second part, wherein the inner threads of the adjustment nut are located on one of the first and second parts while the other of the first and second parts is free from the inner threads engaging with the height adjustment screw, and wherein the first part is adapted to be attached to the second part by a mutual linear movement parallel with a center axis of the height adjustment screw.

2. The height adjustment device according to claim 1, wherein the inner threads are located at the first part which is connected to the bracket and the second part comprises a corresponding, partly cylindrical surface without threads.

3. The height adjustment device according to claim 1, wherein the first part comprises grooves, and the second part comprises tongues, which are insertable in the grooves in a direction parallel to the center axis.

4. The height adjustment device according to claim 1, wherein a snap function is provided to keep the first and second parts in engagement at an end of said linear movement.

5. The height adjustment device according to claim 1, wherein the height adjustment screw is fitted between first and second recesses in the chassis.

6. The height adjustment device according to claim 1, wherein the height adjustment screw comprises at least one thread stop that prevent further movement beyond a defined end position.

7. The height adjustment device according to claim 1, wherein the height adjustment screw is made up from two halves, joined along the center axis.

8. The height adjustment device according to claim 1, wherein the bracket is made in one piece with either of the first and second parts.

9. The height adjustment device according to claim 1, wherein the adjustment nut and the height adjustment screw are made in a plastic material.

10. A robotic mower comprising a chassis, wheels carrying the chassis, and a cutting arrangement suspended by the chassis, wherein the cutting arrangement is arranged in the chassis with a height adjustment device, the height adjustment device comprising:

a height adjustment screw having outer threads and being oriented substantially vertically and arranged rotatably in relation to the chassis, and an adjustment nut connected to a bracket and comprising inner threads for engagement with the outer threads of the height adjustment screw, such that a rotary movement of the height adjustment screw results in a vertical linear movement of the bracket, wherein the adjustment nut comprises a first part and a second part which together enclose the height adjustment screw, the first part being adapted to be attached to the second part, wherein the inner threads of the adjustment nut are located on one of the first and second parts while the other of the first and second parts is free from the inner threads engaging with the height adjustment screw, and wherein the first part is adapted to be attached to the second part by a mutual linear movement parallel with a center axis of the height adjustment screw.

11. The robotic mower according to claim 10, wherein the height adjustment screw is arranged in the chassis, being fitted in between first and second recesses therein.

12. The robotic mower according to claim 10, wherein a driving electric motor is attached to and enclosed by to a cutting arrangement casing, which is slideable with regard to the chassis.

* * * * *